Feb. 9, 1960 W. M. SCOTT, JR 2,924,752
COMBINED CIRCUIT BREAKER AND SHORT CIRCUITER
Filed July 12, 1957 3 Sheets-Sheet 1

INVENTOR.
WILLIAM M. SCOTT JR.
BY
ATTORNEYS

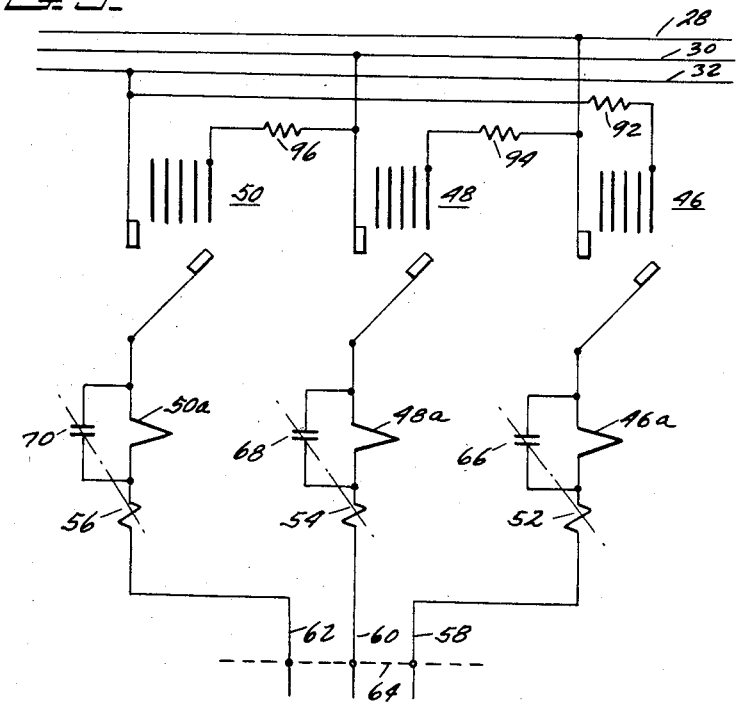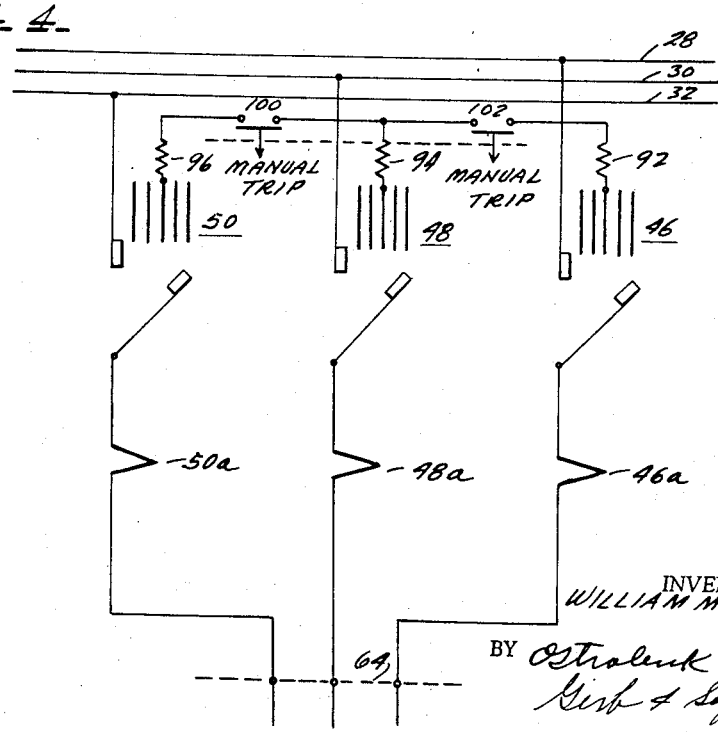

Feb. 9, 1960    W. M. SCOTT, JR    2,924,752
COMBINED CIRCUIT BREAKER AND SHORT CIRCUITER
Filed July 12, 1957    3 Sheets-Sheet 3
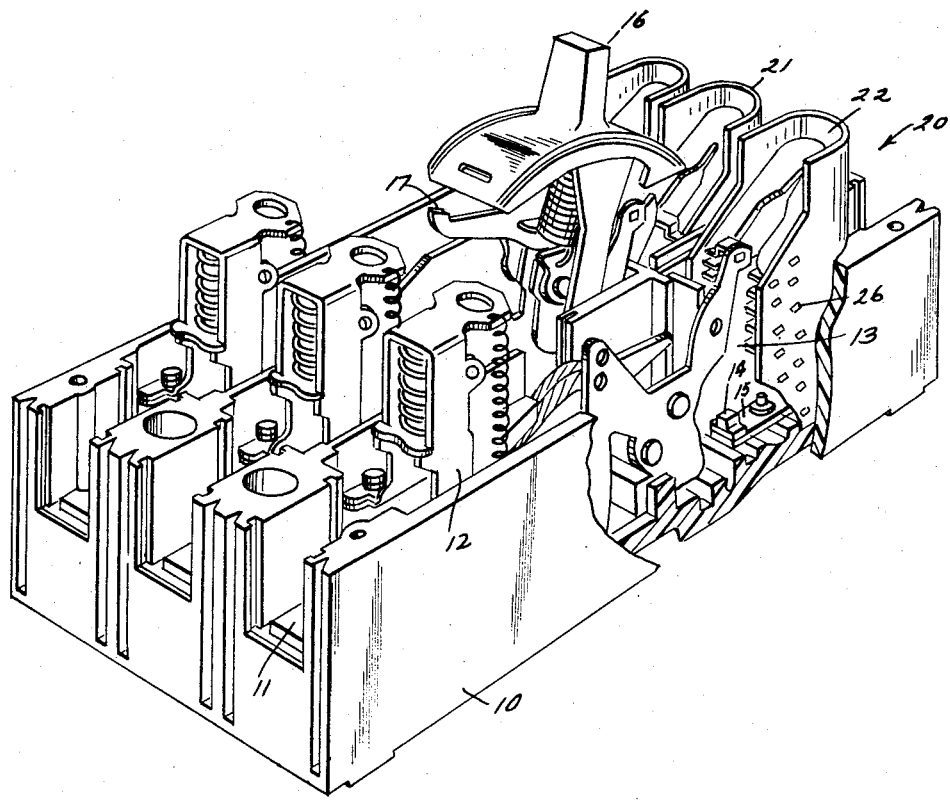
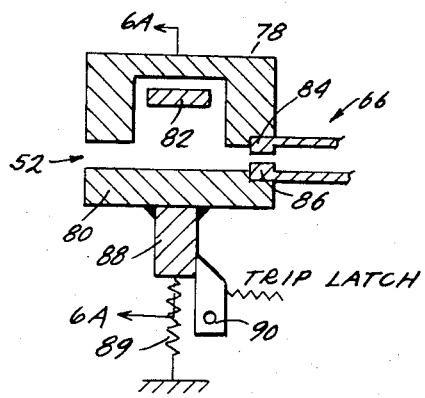
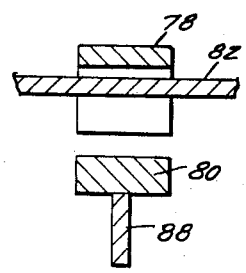
INVENTOR.
WILLIAM M. SCOTT, JR.
BY
ATTORNEYS

United States Patent Office 2,924,752
Patented Feb. 9, 1960

2,924,752
COMBINED CIRCUIT BREAKER AND SHORT CIRCUITER

William M. Scott, Jr., Bryn Mawr, Pa., assignor to I-T-E Circuit Breaker Company, Philadelphia, Pa., a corporation of Pennsylvania Application July 12, 1957, Serial No. 671,532

17 Claims. (Cl. 317—11)

My invention relates to an adaption of a circuit interrupting device wherein the circuit interrupter is short circuited responsive to the occurrence of a fault whereby the fault current flowing through the conductors on the load side of the breaker is reduced.

When a fault occurs on the load side of a circuit breaker, all of the cables or conductors on the load side are subjected to the magnetic and thermal stresses due to the fault current. However, while the circuit breaker has a sufficient interrupting capacity to withstand the fault current, the load conductors, which could for example be Number 14 wire, do not.

In accordance with my novel invention, I provide a deliberate short circuit of load conductors within the circuit breaker itself whereby fault current is diverted from the load conductors and through the short circuit, this short circuit current being interrupted by the circuit interrupting device.

My novel invention may be further applied to high voltage type circuit breakers which, as is well known in the art, have difficulty in extinguishing relatively small fault currents since the ampere turns of the blow-out coil of the circuit breaker is not sufficient to force the arc into the arc chute. If, however, a deliberate short circuit is placed across the load conductors within the circuit breaker responsive to the occurrence of a relatively low fault (as may be indicated by energization of a trip coil), then a high fault current will flow through the short circuit and a strong magnetic field will be created by the blowout coil to drive the arc into the arc chute to thereby extinguish the arc and open the circuit.

In one embodiment of my invention the short circuit connection is made immediately in front of the heater coil of the circuit breaker overload trip unit, and includes contact means which are closed responsive to the occurrence of a fault current. These contact means may then close a low resistance phase to phase short circuit whereby current will be diverted from the relatively low fault in the conductors on the load side to this relatively low resistance short circuit path. Hence, both the heater, as well as the cables or conductors on the load side, are protected during short circuit conditions. Furthermore, the circuit breaker itself will see a relatively high short circuit current which will be more rapidly extinguished than would be the original relatively low short circuit current.

Clearly, the short circuit path may contain resistance means therein which will limit the short circuit current to the interrupting capacity of the circuit breaker.

In another embodiment of my invention, selected arc chute plates of the various circuit breaker phases may be connected together. These plates are isolated from one another when there is no arc between the cooperating contacts, but as soon as the breaker is energized to open responsive to a fault condition in the load then a current path including the ionized gas of the arc and the electrical circuit interconnecting the arc chute plates of the various phases will form a short circuit of relatively low impedance within the circuit breaker.

Hence, the cable or conductors of the load as well as the trip unit of the circuit breaker are protected by this short circuit path, and when the fault is interrupted by the circuit breaker contacts the short circuit path will be opened.

Accordingly, the primary object of my invention is to provide a novel short circuit means for circuit interrupting devices.

Another object of my invention is to provide a novel short circuit means for circuit interrupters which operates to protect load conductors from the thermal and magnetic stresses of fault currents in the load circuit.

Another object of my invention is to provide a novel short circuiting means for creating a short circuit in front of the load conductors leading out of the circuit breaker responsive to a fault condition in the load circuit whereby the circuit breaker sees a relatively high fault current which flows through said short circuit while the circuit breaker trip elements and the load conductors are protected against high fault currents.

Another object of my invention is to provide a novel short circuiting means for high voltage circuit breakers wherein a low fault current flowing in the load is seen as a high fault current flowing through the circuit breaker and the short circuit means.

Still another object of my invention is to provide a short circuiting means for circuit interrupting devices which comprises an interconnection of the arc chute plates of the circuit breaker phases.

Another object of my invention is to provide a short circuit means connected in front of the heater coil of a circuit breaker and includes contact devices which normally maintain the short circuit path open and are closed responsive to the occurrence of a fault in the load circuit.

These and other objects of my invention will become apparent from the following description when taken in connection with the drawings, in which:

Figure 3 shows a modification of the device of Figure 2.

Figure 4 shows how the device of Figure 3 can be modified to prevent short circuit operation during manual opening conditions.

Figure 5 shows a typical molded case circuit breaker to which my invention may be applied.

Figure 6 shows a typical structure for the trip coil and contact arrangement of Figures 1 and 2.

Figure 1:
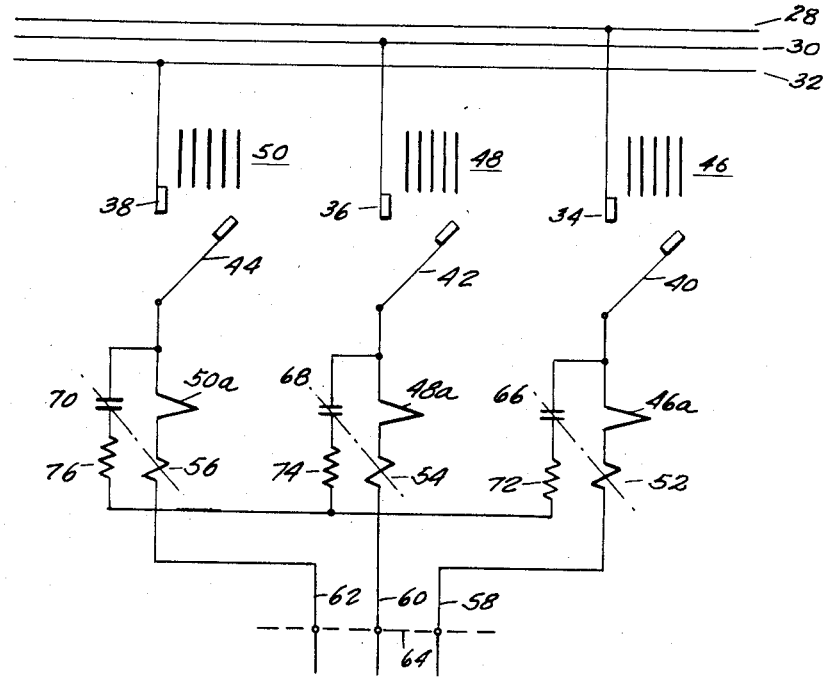
Figure 1 shows a first embodiment of my novel circuit breaker adaption.

My novel short circuit adaption may be applied to any type of circuit breaker such as the molded case circuit breaker set forth in Figure 5 and described in U.S. Patent 2,648,742 to Edmunds and assigned to the assignee of the instant invention.

In general, the circuit breaker of Figure 5 comprises a standard commercial type of three-pole circuit breaker having an insulating housing 10 and appropriate recesses and supports for the various circuit breaker elements.

Current passes from terminal 11 through the calibrated trip unit 12 to the movable contact 13, then to the stationary contact 14; and then through the terminal strip 15 to the opposite terminal.

Handle 16 operates the contacts 13 to open and closed position. The latch member 17 engaged by the tripping device permits the handle 16 to move contacts 13 to the closed position. When the latch member 17 is released by operation of the tripping device 12, then contact 13 moves to the open position drawing an arc between the stationary and movable contacts.

The arc chute 20 is a deveolpment of the arc chute shown in Patent No. 2,244,061. It consists of a fibre insulating wall 21 supporting a plurality of spaced plates 22, 23, 24. The plates are provided with appropriate extensions 26 which pass through appropriate openings in the insulating wall 21 and which are twisted after passing through the openings in order to secure the plates in position.

A first embodiment of my novel invention is set forth in Figure 1 which schematically shows a circuit breaker which could be of the type above described in conjunction with Figure 5.

More specifically, the embodiment of Figure 1 shows a three phase A.-C. source comprising conductors 28, 30 and 32 which are electrically connected to stationary contacts 34, 36 and 38 respectively of the schematically illustrated circuit breaker. Each of stationary contacts 34, 36 and 38 cooperate with the schematically illustrated movable contacts 40, 42 and 44 respectively wherein each of the pairs of cooperating contacts have sets of arc chute plates 46, 48 and 50 respectively.

Each of the circuit breaker phases are then connected in series with heater elements 46a, 48a and 50a respectively, which could be the heater of an overload trip unit, as well as coils 52, 54 and 56 respectively which could be the sensing coil for the instantaneous trip unit of the circuit breaker. Each of the phases are then connected to the load conductors 58, 60 and 62 respectively.

In the event of a fault on the load side as schematically illustrated by dotted line 64, the fault current, while being within the interrupting capacity of the circuit breaker, may be above the capacity of load conductors 58, 60 and 62 respectively.

In accordance with my novel invention, however, I provide a by-pass short circuit which, in Figure 1, includes normally open contact members 66, 68 and 70 respectively for each phase. Each of normally open contact members 66, 68 and 70 may then be connected in series with current limiting resistors 72, 74 and 76 respectively which serve a current limiting function.

Contacts 66, 68 and 70 may be operated to their closed position responsive to the occurrence of a fault on the load conductors by either having them operate responsive to energization of instantaneous trip coils 52, 54 and 56 respectively, or through energization of some alternative means.

One type of structure wherein trip coils 52, 54 and 56 may cause operation of their associated contact members is set forth in Figures 6 and 6a for the case of contact member 66.

More specifically, Figures 6 and 6a show the trip unit 52 including a relatively fixed magnetic member 78 and a relatively movable armature member 80 for the magnetic circuit of the trip unit, while the conductor 82 which carries load current passes through the center of the magnetic circuit and forms the energizing coil therefor.

The contact 66 is comprised of a relatively fixed contact member 84 which is rigidly fastened to magnetic member 78 and a cooperating movable contact 86 which is rigidly fastened to the armature member 80.

Responsive to the flow of fault current through conductor 82 it is clear that the armature 80 will be moved toward the stationary magnetic member 78 against the force of open bias member 89 whereby cooperating contacts 84 and 86 will engage, and an extension 88 of the armature 80 may release a trip latch 90 which can effect subsequent disengagement of the circuit breaker contacts.

Clearly, each of contact structures 68 and 70 may be constructed in the same manner whereby energization of any of the instantaneous trip means 52, 54 or 56 (or any other sensing coil in the circuit) will drive the contacts to their engaged position.

Once the contacts 66, 68 and 70 are moved to their engaged position, a short circuit is established between the phases and in front of the load conductors 58, 60 and 62 as well as the heater elements 46, 48 and 50. Hence fault current which would normally flow through the load conductors will be diverted through the short circuit and the load conductors will thereby be protected during the fault condition. The circuit breaker will see and interrupt the relatively high current flowing through the established short circuit path, this current being limited to the interrupting capacity of the circuit breaker by resistors 72, 74 and 76.

It is to be noted that when the circuit breaker is of the inverse time type wherein high fault currents are interrupted faster than low fault currents, the fault will be more quickly cleared than if the circuit breaker had only seen the relatively low fault condition established at dotted line 64.

The circuitry of Figure 1 could be altered in many ways while still encompassing the principle of my invention. Thus the interconnection between the operating coils and contacts could be of any desired type such as that set forth in U.S. Patent 2,574,093 and assigned to the assignee of the instant application; the short circuit could be established behind the thermal trip units 46, 48 and 50, if desired; and resistors 72, 74 and 76 could be eliminated, or could be adjustable, if desired.

Figure 2:
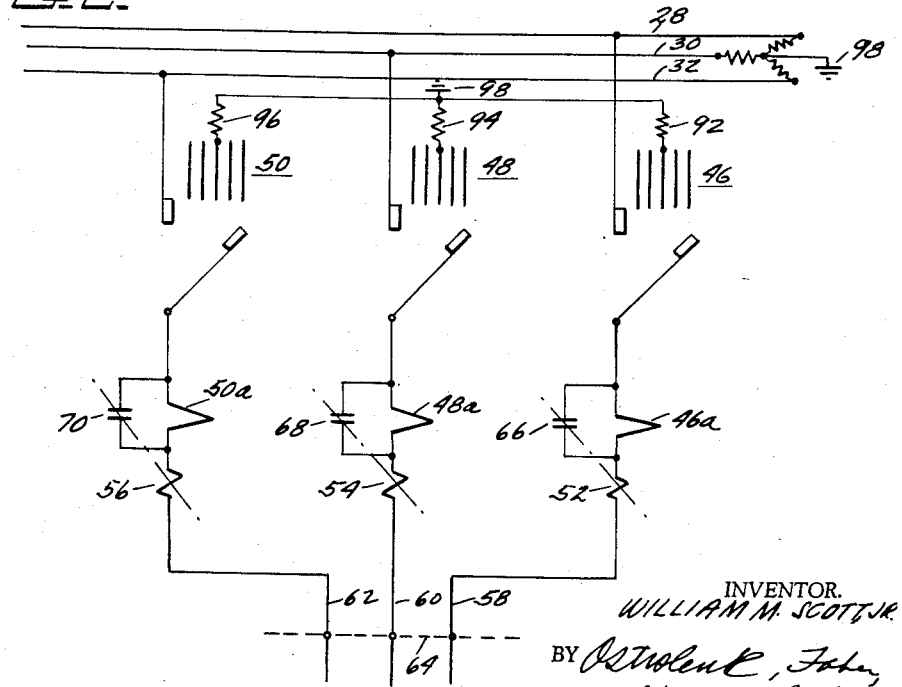
Figure 2 shows a second embodiment of my novel invention where the arc plates of the arc chute are utilized in the short circuit path.

Figure 2 shows a second embodiment of my novel invention wherein similar components have been assigned similar reference numerals.

However, in Figure 2, the short circuit path is established through a connection to the central plate of each of the arc plate assemblies 46, 48 and 50, these arc plates being of the metallic or current conducting type.

It is further seen in Figure 2 that the protective contact means 66, 68 and 70 are connected directly across their associated heater elements 46, 48 and 50 whereby these elements are short circuited responsive to the occurrence of a fault on the load conductors for protection of the heater elements. Clearly, however, the circuit to be described hereinafter may operate independently of this type protective means.

Figure 2 further shows the energization of conductors 28, 30 and 32 as being taken from a Y connected transformer having a grounded neutral. The short circuit path is taken from the central plate of the various phases and is connected in series with resistors 92, 94 and 96 respectively which merely serve current limiting functions and then to ground 98.

In operation, when the cooperating contacts of the various circuit breaker phases are closed, the short circuit path from phase to ground for each of the phases will be open and the circuit will have no effect on the normal operation.

When, however, a fault is established, as indicated by dotted line 64, the circuit breaker contacts will be opened and will draw an arc. Since the plates 46, 48 and 50 of the various arc chutes are of the metallic or conducting type, the arc drawn in each of the arc chutes will establish a current path from their respective contacts 34, 36 and 38 to ground 98 through the resistors 92, 94 and 96 respectively and will be subsequently interrupted. Clearly, once the arc is extinguished in each of the phases, the short circuit path will once again be opened.

Hence, even though the fault at dotted line 64 draws a relatively low fault current so far as the circuit breaker is concerned (although it may be above the capacity of the load conductors) the circuit breaker itself will be short circuited so as to provide a protective low resistance path in front of the load conductors, as was the case in Figure 1.

Furthermore, the circuit breaker will see a fault current which may be of a substantially greater magnitude than that which would normally have existed whereby the fault will be cleared in a substantially shorter time than would have been the case in the absence of my novel short circuit path.

While Figure 2 has shown my novel circuit as being connected from a central plate of each of the arc chute plates 46, 48 and 50, it is to be understood that many types of connections would come within the scope of my novel invention.

By way of example, Figure 3 wherein parts similar to those of Figure 2 are given similar reference numerals, sets forth a normally open short circuit path utilizing the circuit breaker arc chute plates wherein the last plate in the arc chute is connected to an adjacent phase through a current limiting resistor. Thus, the last arc chute plate of arc chute plates 46, 48 and 50 are connected to the phases including contacts 38, 34 and 36 respectively. In operation, it is clear that this circuit will establish a phase to phase fault responsive to operation of the circuit breaker in a manner substantially identical to that set forth above in Figure 2.

In order to avoid the necessity of interrupting fault current which would flow through my novel short circuit path during manual operation of the circuit breaker, a simple contact device may be inserted in the circuit, as set forth in Figure 4, which would open the circuit responsive to and immediately before operation of the manual trip means. Thus, as is shown in Figure 4, contact means 100 and 102, which could comprise normally closed contacts, are moved to their disengaged position responsive to operation of a manual trip means.

Although this interconnection between the manual trip means and the contact means 100 and 102 is not set forth in Figure 4 for reasons of clarity, any simple mechanical linkage or electromagnetic means which would be immediately obvious to anyone skilled in the art could be effective to operatively connect the manual trip means and contacts 100 and 102 to open contacts 100 and 102 responsive to manual trip operation.

Thus, when the manual trip mechanism is operated, contacts 100 and 102 will be opened to thereby disconnect the phase to phase interconnection which includes the current limiting resistors 92, 94 and 96, and the circuit breaker will not interrupt short circuit current during manual operation.

Although I have described preferred embodiments of my novel invention, many variations and modifications will now be obvious to those skilled in the art, and I prefer, therefore, to be limited not by the specific disclosure herein but only by the appended claims.

I claim:

1. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, latch means associated with at least one of said contacts constructed to latch said contacts in said engaged position when said contacts are moved to said engaged position, and overload sensing means for defeating said latch means and allowing said circuit breaker contacts to be disengaged; a short circuit connection for short circuiting the load conductors when said contacts are moved to their disengaged position, said short circuit connection being normally open when said contacts are in their engaged position.

2. In a crcuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, latch means associated with at least one of said contacts constructed to latch said contacts in said engaged position, and overload sensing means for defeating said latch means and allowing said circuit breaker contacts to be disengaged, said overload sensing means including a thermal trip member connected in series with the load conductors; a short circuit connection for short circuiting the said load conductors and said thermal trip member when said contacts are moved to their disengaged position, said short circuit connection being normally open when said contacts are in their engaged position.

3. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts; a short circuit connection for short circuiting the load conductors when said contacts are moved to their disengaged position, said short circuit connection being normally open when said contacts are in their engaged position.

4. In a circuit breaker for connecting and disconnecting a power source and a load, said circuit breaker comprising a pair of cooperable contacts movable into and out of engagement with respect to one another to respectively connect and disconnect said power source and said contacts for extinguishing arcs created during disengagement of said contacts; a short circuit connection for short circuiting the said load conductors and said thermal trip member when said contacts are moved to their disengaged position, said short circuit connection being normally open when said contacts are in their engaged position.

5. In a multi-phase circuit breaker for connecting and disconnecting a multi-phase power source and a load, said multi-phase circuit breaker comprising a respective pair of cooperable contacts for each phase of said power source movable into and out of engagement with respect to one another to respectively connect and disconnect said multi-phase power source and said load, a respective arc extinguishing means associated with each of said pairs of cooperable contacts for extinguishing arcs created during disengagement of their said respective contacts; latch means associated with at least one contact of each of said pairs of contacts constructed to latch said contacts in said engaged position when said contacts are moved to said engaged position, and overload sensing means associated with at least one of said phases for defeating each of said latch means and allowing each of said pairs of circuit breaker contacts to be disengaged; a short circuit connection for short circuiting the load conductors when said contacts are moved to their engaged position, said short circuit connection being normally open when said contacts are in their engaged position.

6. In a multi-phase circuit breaker for connecting and disconnecting a multi-phase power source and a load, said multi-phase circuit breaker comprising a respective pair of cooperable contacts for each phase of said power source movable into and out of engagement with respect to one another to respectively connect and disconnect said multi-phase power source and said load, a respective arc extinguishing means associated with each of said pairs of cooperable contacts for extinguishing arcs created during disengagement of their said respective contacts; a short circuit connection for short circuiting each of the load conductors when said contacts are moved to their disengaged position, said short circuit connection being normally open when said contacts are in their engaged position.

7. In a multi-phase circuit breaker for connecting and disconnecting a multi-phase power source and a load, said multi-phase circuit breaker comprising a respective pair of cooperable contacts for each phase of said power source, movable into and out of engagement with respect to one another to respectively connect and disconnect said multi-phase power source and said load, a respective arc extinguishing means associated with each of said pairs of cooperable contacts for extinguishing arcs created during disengagement of their said respective contacts; latch means associated with at least one contact of each of said pairs of contacts constructed to latch said contacts in said engaged position, and overload sensing means associated with at least one of said phases for defeating each of said latch means and allowing each of said pairs of circuit breaker contacts to be disengaged, said overload sensing means including a thermal trip member; a short circuit connection for short circuiting the said load conductors and said thermal trip member when said contacts are moved to their disengaged position, said short circuit connection being normally open when said contacts are in their engaged position.

8. In a circuit breaker for connecting and disconnecting a power source and a load, said circuit breaker comprising a pair of coperable contacts movable into and out of engagement with respect to one another to respectively connect and disconnect said power source and said load, arc extinguishing means associated with said cooperable contacts for extinguishing arcs created during disengagement of said contacts; a short circuit connection for short circuiting the load conductors when said contacts are moved to their disengaged position, said short circuit connection being normally open when said contacts are in their engaged position; said short circuit connection including normally open auxiliary contact means connected to short circuit said load conductors when said auxiliary contact is moved to its engaged position, said auxiliary contact being moved to said engaged position resonsive to an overload current in said load conductors.

9. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, latch means associated with at least one of said contacts constructed to latch said contacts in said engaged position when said contacts are moved to said engaged position, and overload sensing means for defeating said latch means and allowing said circuit breaker contacts to be disengaged, said overload sensing means including a thermal trip member connected in series with a load conductor; a short circuit connection for short circuiting the said load conductor and said thermal trip member when said contacts are moved to their disengaged position, said short circuit connection being normally open when said contacts are in their engaged position; said short circuit connection including normally open auxiliary contact means connected to short circuit said load conductor when said auxiliary contact is moved to its engaged position, said auxiliary contact being moved to said engaged position responsive to an overload in said load conductors; said connection of said auxiliary contact being made before said thermal trip members as well as the said load conductor whereby said thermal trip member is protected by the short circuit formed by said auxiliary contact responsive to fault conditions in the load circuit.

10. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts; a short circuit connection for short circuiting the load conductors when said contacts are moved to their disengaged position, said short circuit connection being normally open when said contacts are in their engaged position; said short circuit connection including normally open auxiliary contact means connected to short circuit said load conductors when said auxiliary contact is moved to its engaged position, said auxiliary contact being moved to said engaged position responsive to an overload in said load conductors; said circuit breaker further including an instantaneous trip means constructed to create a predetermined magnetic field responsive to the occurrence of a fault in the load circuit, said auxiliary contact being constructed to move to said engaged position responsive to the creation of said predetermined magnetic field by said insantaneous trip means.

11. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, said arc extinguishing means including arc plates of current conducting material; a short circuit connection for short circuiting the load conductors when said contacts are moved to their disengaged position, said short circuit connection being normally open when said contacts are in said engaged position; said short circuit connection comprising a current carrying connection from one of said arc extinguishing plates to the circuit breaker contact connected to the power source side of said circuit breaker.

12. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts; a short circuit connection for short circuiting the load conductors when said contacts are moved to their disengaged position, said short circuit connection being normally open when said contacts are in their engaged position; said short circuit connection including normally open auxiliary contact means connected to short circuit said load conductors when said auxiliary contact is moved to its engaged position, said auxiliary contact being moved to said engaged position responsive to an overload current in said load conductors, said auxiliary contact having current limiting means connected in series therewith to limit the short circuit current flow through said short circuit.

13. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, said arc extinguishing means including arc plates of current conducting material; a short circuit connection for short circuiting the load conductors when said contacts are moved to their disengaged position, said short circuit connection being normally open when said contacts are in said engaged position; said short circuit connection comprising a current carrying connection from one of said arc extinguishing plates to the circuit breaker contact connected to the power source side of said circuit breaker, said short circuit connection having current limiting means connected in series therewith to limit the short circuit current flow through said short circuit.

14. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, said arc extinguishing means including arc plates of current conducting material; latch means associated with at least one of said contacts constructed to latch said contacts in said engaged position when said contacts are moved to said engaged position, and overload sensing means for defeating said latch means and allowing said circuit breaker contacts to be disengaged; a short circuit connection for short circuiting the load conductors when said contacts are moved to their disengaged position, said short circuit connection being normally open when said contacts are in their engaged position; said short circuit connection comprising a current carrying connection from one of said arc extinguishing plates to the circuit breaker contact connected to the power source side of said circuit breaker.

15. In a multi-phase circuit breaker for connecting and disconnecting a multi-phase power source and a load, said multi-phase circuit breaker comprising a respective pair of cooperable contacts for each phase of said power source movable into and out of engagement with respect to one another to respectively connect and disconnect said multi-phase power source and said load, a respective arc extinguishing means associated with each of said pairs of cooperable contacts for extinguishing arcs created during disengagement of their said respective contacts; a short circuit connection for short circuiting each of the load conductors when said contacts are moved to their disengaged position, said short circuit connection being normally open when said contacts are in their engaged position; said arc extinguishing means including arc plates of current conducting material; said short circuit connection comprising the interconnection of a selected plate of each of said arc extinguishing means of each phase.

16. In a circuit breaker for connecting and disconnecting a power source and a load, said circuit breaker comprising a pair of cooperable contacts movable into and out of engagement with respect to one another to respectively connect and disconnect said power source and said load, arc extinguishing means associated with said cooperable contacts for extinguishing arcs created during disengagement of said contacts, said arc extinguishing means including arc plates of current conducting material; a short circuit connection for short circuiting the load conductors when said contacts are moved to their disengaged position, said short circuit connection being normally open when said contacts are in said engaged position; said short circuit connection comprising a current carrying connection from one of said arc extinguishing plates to the circuit breaker contact connected to the power source side of said circuit breaker; and means manually operable to open said short circuit connection.

17. In a multi-phase circuit breaker for connecting and disconnecting a multi-phase power source and a load, said multi-phase circuit breaker comprising a respective pair of cooperable contacts for each phase of said power source movable into and out of engagement with respect to one another to respectively connect and disconnect said multi-phase power source and said load, a respective arc extinguishing means associated with each of said pairs of cooperable contacts for extinguishing arcs created during disengagement of their said respective contacts; a short circuit connection for short circuiting each of the load conductors when said contacts are moved to their disengaged position, said short circuit connection being normally open when said contacts are in their engaged position; said arc extinguishing means including arc plates of current conducting material; said short circuit connection comprising the interconnection of a selected plate of each of said arc extinguishing means of each phase; and means manually operable to open said short circuit connection.

References Cited in the file of this patent

UNITED STATES PATENTS

| | | |
|---|---|---|
| 1,717,260 | Rankin | June 11, 1929 |
| 2,600,305 | Lincks | June 10, 1952 |
| 2,702,358 | Woodward | Feb. 15, 1955 |
| 2,767,309 | Schaner | Oct. 16, 1956 |
| 2,849,659 | Kesserlring | Aug. 26, 1958 |